US011999815B2

(12) United States Patent
De Combarieu et al.

(10) Patent No.: US 11,999,815 B2
(45) Date of Patent: Jun. 4, 2024

(54) PROCESS FOR PREPARING A BLOCK OF POLYURETHANE/POLYISOCYANURATE FOAM OF A SLAB FOR HEAT-INSULATING A TANK

(71) Applicant: Gaztransport Et Technigaz, Saint Remy les Chevreuse (FR)

(72) Inventors: Guillaume De Combarieu, Saint Remy les Chevreuse (FR); Patrick Kitzmann, Saint Remy les Chevreuse (FR); Laetitia Dewolf, Saint Remy les Chevreuse (FR)

(73) Assignee: Gaztransport Et Technigaz, Saint Remy les Chevreuse (FR)

( * ) Notice: Subject to any disclaimer, the term of this patent is extended or adjusted under 35 U.S.C. 154(b) by 164 days.

(21) Appl. No.: 17/414,906

(22) PCT Filed: Jan. 15, 2020

(86) PCT No.: PCT/EP2020/050922
§ 371 (c)(1),
(2) Date: Jun. 16, 2021

(87) PCT Pub. No.: WO2020/148339
PCT Pub. Date: Jul. 23, 2020

(65) Prior Publication Data
US 2022/0064357 A1 Mar. 3, 2022

(30) Foreign Application Priority Data
Jan. 16, 2019 (FR) ...................................... 1900395

(51) Int. Cl.
| B32B 25/16 | (2006.01) |
| B63B 25/16 | (2006.01) |
| C08G 18/08 | (2006.01) |
| C08G 18/42 | (2006.01) |
| C08G 18/76 | (2006.01) |
| C08J 5/04 | (2006.01) |
| C08J 9/00 | (2006.01) |
| C08J 9/04 | (2006.01) |
| C08J 9/12 | (2006.01) |
| C08J 9/14 | (2006.01) |
| C08K 5/00 | (2006.01) |
| C08K 5/521 | (2006.01) |
| C08L 75/06 | (2006.01) |
| C08G 101/00 | (2006.01) |

(52) U.S. Cl.
CPC ............. *C08G 18/14* (2013.01); *B63B 25/16* (2013.01); *C08G 18/4208* (2013.01); *C08J 5/043* (2013.01); *C08J 9/0085* (2013.01); *C08J 9/125* (2013.01); *C08J 9/141* (2013.01); *C08K 5/0066* (2013.01); *C08K 5/521* (2013.01); *C08G 2101/00* (2013.01); *C08G 2110/005* (2021.01); *C08G 2330/00* (2013.01); *C08J 2203/10* (2013.01); *C08J 2203/14* (2013.01)

(58) Field of Classification Search
None
See application file for complete search history.

(56) References Cited

U.S. PATENT DOCUMENTS

| 3,860,371 A * | 1/1975 | Willy ...................... B29C 44/12 |
| | | 264/45.3 |
| 2004/0053035 A1* | 3/2004 | Haas ........................ B32B 5/18 |
| | | 264/45.4 |
| 2007/0015842 A1* | 1/2007 | Moerman .......... C08G 18/4018 |
| | | 521/82 |
| 2019/0233571 A1 | 8/2019 | Diendorf et al. |

FOREIGN PATENT DOCUMENTS

| FR | 2882756 A1 | 9/2006 |
| JP | 2006-214458 A | 8/2006 |
| JP | 2006-241453 A | 9/2006 |
| JP | 2019-518855 A | 7/2019 |
| KR | 20000010021 A | 2/2000 |
| WO | WO 2019/108344 A1 | 6/2019 |

OTHER PUBLICATIONS

Dave et al., "Processing of Composites", ISBN 7-5025-4783-5; ISBN 3-446-18044-3; (Beijing) Xindengzi No. 039 Cataloging of Books in Publication (CIP) data Polymer Composite Materials Processing Engineering / [US R.S. Dave A.C. Edited by Luce: Fang Zhengping, translated by Shen Lie—Beijing: Chemical Industry Press, Sep. 2003.
Rewer, Teaching Books for Colleges and Universities, "Powder Metallurgy Principle and Application" Metallurgical Industry Press, ISBN 7-5024-0507-0, 1989.
Zhongquan et al., "Seismic Resistance of Petrochemical Equipment" Beimu Publishing House, Dec. 1995; ISBN7-5028-1269-5/P.
Office Action issued in JP Application No. 2021-541020 dated Jun. 27, 2023.
Office Action issued in JP Application No. 2021-541020 dated Feb. 27, 2024.

* cited by examiner

*Primary Examiner* — Melissa A Rioja
(74) *Attorney, Agent, or Firm* — Blank Rome LLP

(57) ABSTRACT

The present invention relates to a preparation of a block of fiber-reinforced polyurethane/polyisocyanurate foam in which the expansion of the foam is constrained by the walls of a double belt laminator forming a tunnel, the block of fiber-reinforced polyurethane/polyisocyanurate foam being composed of cells storing a gas, advantageously having low thermal conductivity, and exhibiting a density of less than 50 kg·m$^{-3}$ with a content of fibers $C_f$ representing at least 4% by weight of the block of fiber-reinforced foam, in which the impregnation time of the fibers $t_i$ is less than the cream time $t_c$ of the polyurethane/polyisocyanurate foam.

20 Claims, 2 Drawing Sheets

[Fig. 1]
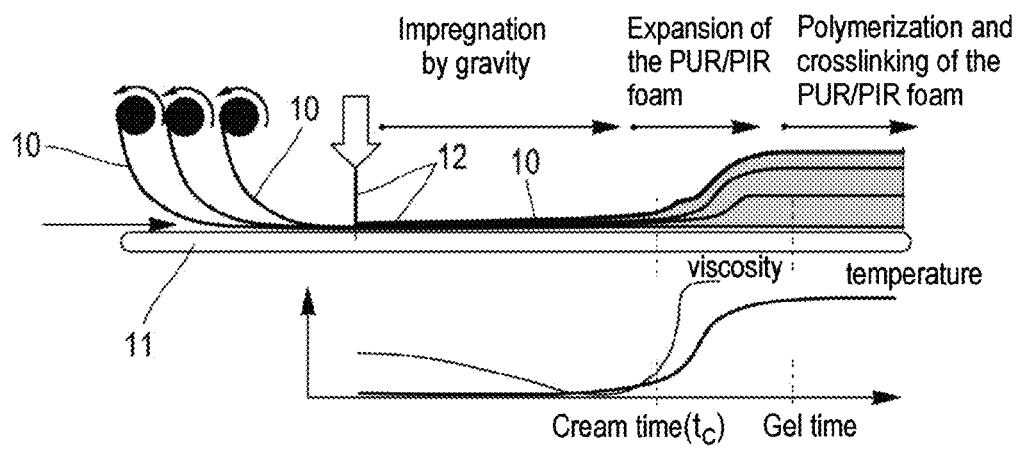
[Fig. 2]
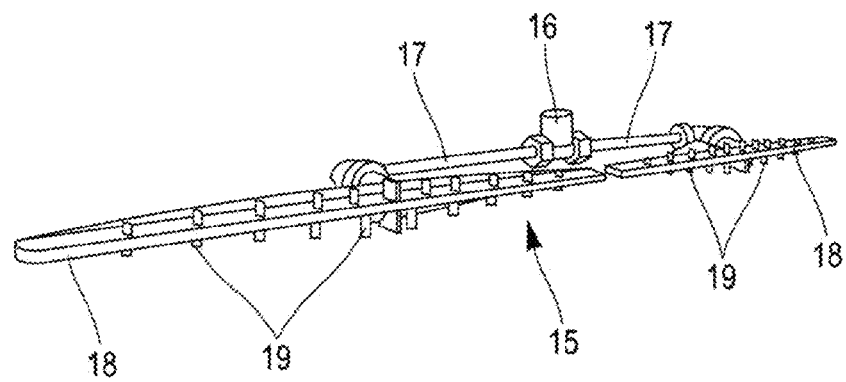
[Fig. 3]
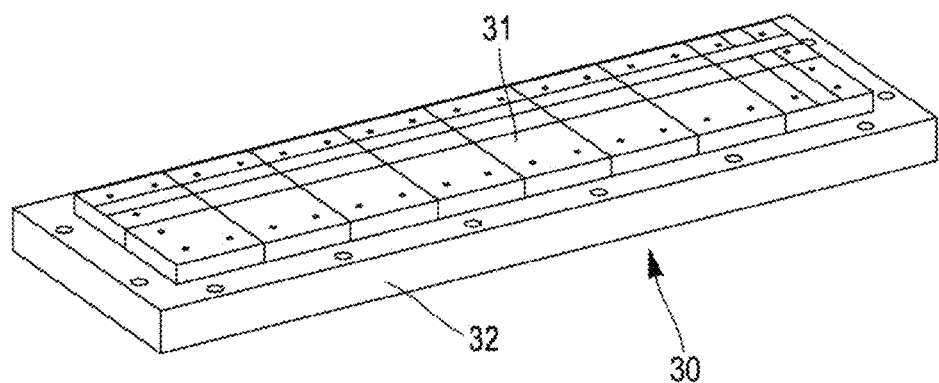
[Fig. 4]

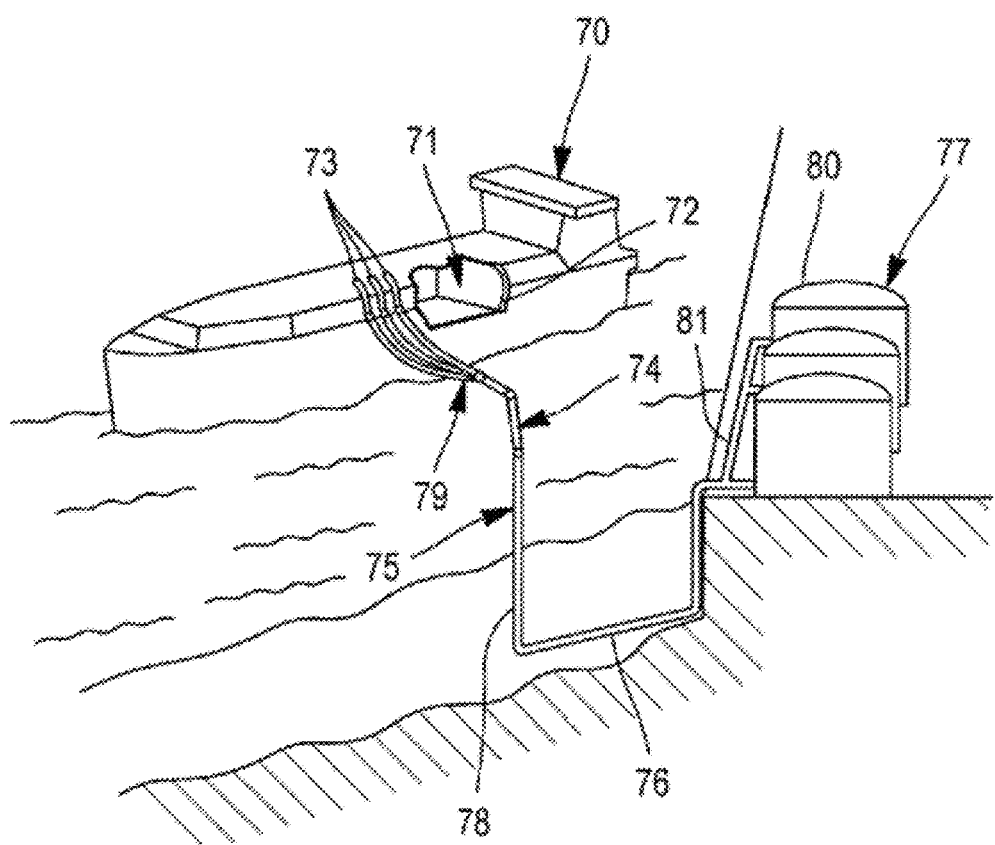

PROCESS FOR PREPARING A BLOCK OF POLYURETHANE/POLYISOCYANURATE FOAM OF A SLAB FOR HEAT-INSULATING A TANK

CROSS-REFERENCE TO RELATED APPLICATIONS

This application is a U.S. national stage application based on International Application No. PCT/EP2020/050922 filed Jan. 15, 2020, which claims priority to French Application No. 1900395, filed Jan. 16, 2019, both of which are herein incorporated by reference in their entirety.

TECHNICAL FIELD

A subject matter of the invention is a process for the preparation of blocks of fiberized polyurethane (PUR) and/or polyisocyanurate (PIR) foams (containing long to continuous fibers) from at least one polyisocyanate and at least one polyol, said blocks of foams being used within a tank, integrated in a supporting or self-supporting structure of type B or C, serving to receive extremely cold fluids, called cryogenic fluids, such as in particular Liquefied Natural Gas (LNG) or Liquefied Petroleum Gas (LPG).

The present invention also relates to blocks of fiber-reinforced PUR and/or PIR foams which have to exhibit, in view of their specific applications, very particular mechanical and thermal characteristics, while being as economical as possible to produce.

Finally, the present invention relates more particularly to sealed and thermally insulating tanks using such foams directly obtained by this preparation process, as well as to ships equipped with such tanks.

Technological Background

Polyurethane PUR foam is a cellular insulator, composed of fine cells storing a gas which can have low thermal conductivity. PUR foam is used in a very large number of applications, such as the automotive industry, as flexible PUR foam, or in thermal insulation, as rigid PUR foam. The formation of polyurethane-type foams is well known to a person skilled in the art. Its formation entails a multicomponent reaction between a polyol (compound carrying at least two hydroxyl groups), a polyisocyanate (compound carrying at least two isocyanate —NCO functional groups) and an expanding agent, also designated by expression "blowing agent". This condensation reaction is in particular catalyzed by compounds having basic and/or nucleophilic natures, such as tertiary amines or metal-carboxylate coordination complexes, such as tin or bismuth salts. The polyols commonly used in the manufacture of PUR foams are polyether polyols or polyester polyols. Thus, a large number of compounds are necessary for the formation of PUR foam.

Polyisocyanurate (PIR) and polyurethane/polyisocyanurate (PUR-PIR) foams are also used in the building industry (construction/renovation) and exhibit the advantage of providing better fire-resistant properties as well as a greater compressive strength than PURs. The process for the formation of these foams is similar to the process for the formation of PUR foams. This is because obtaining PUR, PIR and PUR-PIR foams depends on the isocyanate/polyol ratio.

The documents FR 2 882 755 and KR 20000010021 are known in the state of the art, which documents describe fiber-reinforced PUR or PIR foams, and their preparations. In these two documents, the PUR or PIR foams exhibit a high density.

Obtaining PUR, PIR and PUR-PIR foams is well known to a person skilled in the art; nevertheless, the addition of fibers entails specific technical problems, in particular if it is desired to obtain a fiber-reinforced PUR, PIR or PUR-PIR foam in which the long to continuous fibers, i.e. of at least five centimeters, are homogeneously dispersed in the foam volume.

In particular, when it is desired to obtain low density fiber-reinforced PUR, PIR and PUR-PIR foams, that is to say foams exhibiting a density of less than 50 kg·m$^{-3}$, the incorporation of fibers is very difficult and generally results in a foam in which the fiber is not homogeneously distributed. This is because, in order to obtain such low density fiber-reinforced foams, it is necessary to concurrently carry out a rapid and homogeneous impregnation of the fibers while using a high proportion of blowing agent. This has the consequence that the blowing agent is no longer completely dissolved in the polyol and then forms an emulsion of blowing agent in the saturated polyol, which it is necessary to stabilize and efficiently mix with the isocyanate. In this context of pouring (under the action of simple gravitation) the prepolymer mixture over the fibers, one solution to this problem consists in increasing the amount of nucleating gas during the polyol/isocyanate mixing, which increases the viscosity and makes it difficult, indeed even impossible, to obtain good penetration of the polyurethane/polyisocyanurate foam into the fibers and thus a block of homogeneous fiber-reinforced foam, the upper parts of the block being devoid, or virtually devoid, of fibers.

Thus, the increase in blowing agent results in a foam of nonhomogeneous structure or density (in terms of fibers), the fiber-reinforced foam thus obtained being thermally inefficient and exhibiting poor mechanical qualities.

Moreover, the increase in the amount of blowing agent requires the use of more reactive chemical components in order to compensate for the endothermic phenomenon related to the significant vaporization of the physical blowing agent, which reduces the cream time and does not make possible good impregnation of the fibers for the purpose of their controlled expansion.

An additional problem lies in the production of an economical foam block, that is to say a block in which it is not necessary to carry out cuts in order to obtain a homogeneous fiber-reinforced foam block, the material losses associated with these cuts conventionally representing of the order of 15%, indeed even more than 20%, which is completely unsatisfactory in an industrial process.

Thus, at the present time, there does not exist a process for the preparation of a block of low density (less than 50 kg·m$^{-3}$) fiber-reinforced polyurethane and/or polyisocyanurate foam making it possible to obtain a block exhibiting very good mechanical properties, as a result in particular of a heterogeneity in the content of fibers in the block.

SUMMARY

It is in this context that the applicant company has succeeded in developing a process for the production of polyurethane (PUR) and/or polyisocyanurate (PIR) foams containing long to continuous fibers in a significant amount making it possible simultaneously to obtain a fiber-reinforced foam which is light and easy to handle and which exhibits excellent mechanical properties, while retaining, indeed even while improving, its excellent thermal insulating performance qualities. Advantageously, it is also possible, according to a preferred embodiment, to very significantly reduce the production cost for such a fiber-reinforced foam as a result of a perfect homogeneity of the latter (the loss of material from the foam block is thus minimal, indeed even negligible).

The term "block" according to the invention is a nonlimiting term. The "block" can have any shape and it is not obligatory for it to be cut.

The present invention thus intends to put right the shortcomings of the state of the art by providing a particularly effective solution, which is simple to implement, for industrially obtaining a low density fiber-reinforced PUR/PIR foam, the mechanical properties of which are optimal.

There has been discovered, by the applicant company, after various studies and analyses, a preparation of a block of fiber-reinforced polyurethane (PUR) and/or polyisocyanurate (PIR) foam, with long to continuous fibers, capable of solving firstly the technical problems of the current preparations, from the viewpoint of the specific objectives related to the final application of such a block of low density foam.

Thus, the present invention relates to a process for the preparation of a block of fiber-reinforced polyurethane/polyisocyanurate foam of a thermal insulation slab of a sealed and thermally insulating tank, the block of fiber-reinforced polyurethane/polyisocyanurate foam being composed of cells storing a gas, advantageously having low thermal conductivity, and exhibiting a density of less than 50 $kg \cdot m^{-3}$ with a content of fibers $C_f$ representing at least 4% by weight of the block of fiber-reinforced foam, the preparation process comprising the following stages:

a) a stage of mixing chemical components necessary for obtaining a polyurethane/polyisocyanurate foam, said components comprising reactants for obtaining polyurethane/polyisocyanurate, optionally at least one reaction catalyst, optionally at least one emulsifier, and at least one blowing agent, b) a stage of impregnation, by gravitational flow of the abovesaid mixture of chemical components, of a plurality of fiber reinforcements, said fibers being long to continuous, arranged in superimposed layers, in which the fiber reinforcements extend essentially along a direction perpendicular to the direction of said gravitational flow, these fiber reinforcements exhibiting a permeability $K_c$ to the abovesaid mixture of chemical components, expressed in $m^2$, equal to:

$$K_c=(r_f^2 \times p^3)/(k \times T^2 \times 4 \times V_f^2), \text{with}$$

$r_f$=radius of the fibers, expressed in meters (m)
p=porosity of the fibers (dimensionless), value between 0 and 1
k=form factor (dimensionless), dependent on the nature of the fibers
t=tortuosity (dimensionless), dependent on the arrangement of the fibers
$V_f$=volume fraction of the fibers (proportion of fibers in a volume of the reinforcement), value between 0 and 1, c) a stage of formation and of expansion of the fiber-reinforced polyurethane/polyisocyanurate foam, the process according to the invention being characterized in that the abovesaid mixture of chemical components exhibits a dynamic viscosity η, during the impregnation stage b), such that an impregnation time of the fibers $t_i$ is less than the cream time $t_c$ of the polyurethane/polyisocyanurate foam, the impregnation time of the fibers $t_i$ being equal to:

$$t_i=(\eta \times e_m^2)/(K_c \times \Delta P),$$

$$\Delta P=(M_{sd} \times g_t \times k_p), \text{with}$$

η=the dynamic viscosity, expressed in pascal·seconds (Pa·s),
$e_m$=sum of the mean thicknesses of the fiber reinforcements, expressed in meters (m),
ΔP=hydraulic pressure gradient or differential, expressed in pascals (Pa)
$M_{sd}$=surface density of the abovesaid mixture of chemical components, expressed as weight per unit area ($kg \cdot m^{-2}$)
$g_t$=terrestrial gravitational force, regarded here as equal to 9.8 $N \cdot kg^{-1}$
$k_p$=mean hydraulic pressure factor, constant equal to 0.5.

The term "cells storing a gas" is understood to mean the fact that the polyurethane/polyisocyanurate foam exhibits closed cells enclosing a gas, preferably exhibiting a low thermal conductivity, originating from a gas injected during a stage of nucleation of the reaction mixture or originating, directly or indirectly, from the chemical or physical expanding agent.

The term "fiber reinforcement" is understood to mean the fact that the fibers can be provided in two distinct forms:
either in the form of at least one fabric of fibers, in which the fibers are perfectly aligned along at least one direction, in other words the fibers exhibit at least one favored direction of fibers. The term "fabric of fibers" refers per se to a clear technical definition known to a person skilled in the art,
or in the form of at least one mat of fibers, in which the fibers do not exhibit a defined orientation, in other words these fibers are oriented isotropically essentially along the main plane of the layer of the mat. Again, the term "mat of fibers" refers per se to a clear technical definition known to a person skilled in the art, According to one embodiment, the expression "a gas (advantageously) having low thermal conductivity" is understood to mean the gas originating from the blowing agent, either by chemical reaction of the latter when this agent is said to be "chemical", conventionally carbon dioxide ($CO_2$) when the chemical blowing agent consists of water, or by a physical blowing agent, such as, for example, molecular nitrogen ($N_2$), molecular oxygen ($O_2$), carbon dioxide, hydrocarbons, chlorofluorocarbons, hydrochlorocarbons, hydrofluorocarbons, hydrochlorofluorocarbons, and their mixtures. The physical blowing agents, such as molecular nitrogen $N_2$, molecular oxygen $O_2$ or $CO_2$, are in the form of gases. These gases are dispersed in the liquid mass of copolymer, for example under high pressure using a static mixer. By depressurizing the system, the nucleation and the growth of bubbles generate a cellular structure.

The expression "the fiber reinforcements extend essentially along a direction perpendicular to the direction of the gravitational flow of the mixture of chemical components" is understood to mean the fact that these fiber reinforcements are provided in the form of a layer of low thickness extending, during the impregnation stage b), along a plane perpendicular to the direction of flow of said mixture of components. Thus, as can be seen in FIG. 1, the plurality of fiber reinforcements, exhibiting a width L and positioned in superimposed layers, are entrained in a longitudinal direction l, while the mixture of chemical components is deposited on the fiber reinforcements from a dispenser allowing/making possible the gravitational flow of the mixture of chemical components. In other words, the mixture of chemical components, optionally exiting the dispenser under pressure, falls under the effect of at least its own weight onto the stacked mats of fibers, thus impregnating these fiber reinforcements from the upper layer down to the lower layer.

The term "$r_f$" relating to the radius of the fibers, expressed in meters (m), is understood to mean the radius of a fiber in the reinforcement or more conventionally the radius, or the quasiradius, considered by the agglomeration of a set of fibers locally forming an agglomerated fiber exhibiting a mean radius, then equivalent to $r_f$. This datum relating to this radius of the fibers $r_f$ is defined by the fiber reinforcement, as one of its essential physicochemical characteristics, and can optionally be characterized by a linear density (g/km) or tex, a measurement of the count (linear density) of yarns and spun yarns, well known to a person skilled in the art, from which data the radius of the fibers $r_f$ is obtained, optionally the mean radius $r_f$ when an agglomeration of fibers is concerned.

In other words, the radius of the fibers $r_f$ is equal to the radius of the fiber in the reinforcement if the fiber does not form part of the agglomerated fiber or to the radius of the agglomerated fiber if several fibers are agglomerated.

The expression "the fibers being long to continuous" (or "long to continuous fibers") is understood to mean the fact that the fibers, or if appropriate an agglomerated fiber (fibers bonded or fixed to one another), all exhibit—or at least 90% of the fibers, considered alone or agglomerated forming the equivalent of a single fiber, by total mass of said fibers, exhibit a length of at least five (5) centimeters (cm).

In the same way, the porosity of the fibers p as well as the tortuosity T are quantities characteristic of the fiber reinforcement under consideration, that is to say that the values of these quantities are known as defining the fiber reinforcement. Thus, these values are conventionally given as defining the fiber reinforcement but they can, of course, be measured by conventional techniques, such as the measurement of a nonturbulent stationary flow, unidirectional or radial, of a calibrated fluid (for example: air, silicone oil) through a defined stack of glass reinforcement, by applying Darcy's law.

In order to measure the porosity of the fibers used in the context of the present invention, whether the latter are provided in the form of a fabric of fibers or of a mat of fibers, it will be possible, for example, to use a sliding caliper, ideally a digital one, measuring the thickness of a sample of stack of—for example approximately ten—fabrics or mats of fibers used. With the width/length dimensions of the sample of fabric/mat of fibers and knowing the density (of the glass, basalt, carbon, hemp, and the like) of the fibers under consideration, the thickness (or height) is measured at several points/locations of the stack of fabric of fibers or mat of fibers, constituting the thickness extremums, so as to determine the mean thickness of the fiber reinforcement (fabric or mat) under consideration and thus to know the volume occupied by the fibers in this fabric of fibers or mat of fibers (the density of the air being regarded in this instance as zero). As stated previously, this porosity is dimensionless, between 0 and 1, that is to say that it represents the void percentage or fraction in a fiber reinforcement (fabric or mat) under consideration, in other words the "fiber porosity".

It is noted that the density of the fibers is a property known as such or accessible to a person skilled in the art. In general, it is clearly understood that the subject matter of the present invention uses materials/products accessible or available on the market, so that their properties, in particular those relating to their densities or (dynamic) viscosities, are available in the specifications relating to the materials/products under consideration.

The tortuosity T of a fiber reinforcement corresponds to the mean tortuosity of the fibers which constitute the fiber reinforcement, the tortuosity of a fiber being equal to the ratio Le/L, with:
  Le: the effective path length, that is to say the length of the curve formed by the fiber;
  L: the surface distance within which the fiber is deformed, that is to say the distance between the two ends of the fiber.

The method for determining the tortuosity of a fiber or of an agglomeration of fibers (designated above as "agglomerated fiber") is described in particular in the thesis by R. Pomeroy, (2009), "Permeability characterisation of continuous filament mats for resin transfer molding", available in particular in the Semantic Scholar database.

Also, the form factor k is a constant defined by the nature of the fiber reinforcement under consideration. Thus, as has been seen above, in the context of the present invention, the fiber reinforcement can consist of a fabric of fibers or of a mat of fibers, a value of this form factor k being given in each of these two cases:
  k=1 for a fabric of fibers, for example carbon fibers,
  k=6 for a mat of fibers, for example a mat of continuous glass fibers.

As regards the fraction $V_f$, it represents the volume fraction of the fibers (volume proportion of the constituent material of the fibers in the bulk volume of the reinforcement), i.e. a value of between 0 and 1, in other words a percentage of fibers (by volume) in the reinforcement (the edges/ends of which define a closed volume). This value $V_f$ is known as an intrinsic characteristic of the fiber reinforcement considered and the value $V_f$ can be measured, for example, by the measurement of the surface density (g/m$^2$), well known to a person skilled in the art, from which it is possible to obtain the volume fraction of the fibers $V_f$. It will optionally be possible to use the international standard ISO 14127:2008 to measure this volume fraction of the fibers $V_f$.

The term $e_m$ represents the sum of the mean thicknesses of the fiber reinforcements, expressed in meters (m); in other words, the mean thickness of each fiber reinforcement is measured and the value of this term $e_m$ is obtained by adding the mean thicknesses for each of the fiber reinforcements. The expression "mean thickness" is understood to mean the mean of the distances between two local extremums of the reinforcement, that is to say the distances between the two most distant points of the reinforcement, located substantially facing each other with respect to a plane of extension of the fiber reinforcement, the measurement of this distance between these two points being repeated in a plurality of zones of the reinforcement in order to determine a mean thickness of the fiber reinforcement which is as accurate as possible. In other words, the mean thickness of a fiber reinforcement corresponds to the mean of the distances between a plurality of pairs of local extremums of said fiber reinforcement spaced out from one another along a direction of thickness of said fiber reinforcement.

The term $\Delta P$ expresses the hydraulic pressure gradient, expressed in pascals (Pa), i.e. a pressure differential which is exerted between the upper layer(s) of fiber reinforcement(s), which layer(s) are impregnated by the mixture of chemical components, and the lower layer(s) of fiber reinforcement(s) which are not yet impregnated by the mixture of chemical components, and thus at a pressure substantially equal to atmospheric pressure. As is seen with the third equation, this term ΔP is a function of the surface density $M_{sd}$ of the abovesaid mixture of chemical components, i.e. an amount of material formed by said mixture per unit area (in this instance expressed in kg·m$^{-2}$).

Thus, all the terms and their respective values used to define the preparation process according to the invention, more particularly the impregnation time $t_i$, are data known per se or can be determined/measured by virtue of techniques known to a person skilled in the art.

The expression "cream time" is understood to mean the time necessary, counting from the mixing of the chemical components, for the latter to begin the polymerization reactions and for the mixture of components to start the expansion and crosslinking stage c) (=formation of the fiber-reinforced PUR/PIR foam). This cream time is a datum well known to a person skilled in the art. In other words, the cream time is the time elapsed until the mixture turns white under the action of the nucleation of the bubbles (cells storing a gas) and of the expansion of the foam after mixing of the chemical components at ambient temperature. The cream time can be determined visually or using an ultrasonic sensor detecting a variation in thickness reflecting the formation of foam.

By virtue of the specific choices of the characteristics of fiber reinforcements and of viscosity of the mixture of chemical components, a block of low density fiber-reinforced PUR/PIR foam is obtained exhibiting perfect homogeneity with regard to the fibers, in other words the content of fibers $C_f$ is the same, to +/−35%, indeed even advantageously to +/−20%, in all the parts of the foam block. This essential characteristic makes it possible to obtain a block of fiber-reinforced foam which is light and can be easily proportioned, in terms of dimensions and shapes, exhibiting excellent mechanical properties, as is demonstrated subsequently by tests carried out by the applicant company.

Thus, the block of fiber-reinforced foam obtained according to the invention is characterized by its controlled and uniform structure and its mechanical properties, in particular of fatigue strength, its tensile strength in the plane normal to the expansion (measured according to the standard ISO 1926) and its low coefficient of thermal contraction in this same plane (measured according to the standard ASTM E 228), which are compatible with use in tanks integrated in a supporting structure but also advantageously type B or C tanks according to IGC regulations (IMO), that is to say as external insulation associated with self-supporting tanks for the storage and/or the transportation of very cold liquids, such as LNG or LPG.

Finally, the thermal properties of the block of fiber-reinforced foam are at least equal to those of the blocks of low density non-fiber-reinforced foam of the state of the art; more precisely, the block of foam exhibits, in the thickness E, a thermal conductivity of less than 30 mW/m·K (milliwatt per meter per Kelvin), i.e. 0.03 W/m·K, preferably of less than 25 mW/m·K, more preferably still of less than 23 mW/m·K, measured at 20° C.

The use, in the composition according to the invention, of a chemical blowing agent can be coupled with that of a physical expanding agent. In this case, the physical expanding agent is preferably mixed in liquid or supercritical form with the foamable (co)polymer composition and then converted to the gas phase during the stage of expansion of the PUR/PIR foam.

Chemical and physical blowing agents are well known to a person skilled in the art, who chooses both of these, in the appropriate amounts, depending on the PUR/PIR foam which he wishes to obtain.

The term polyols is understood to mean any carbon-based structure carrying at least two OH groups.

As the PUR, PIR and PUR-PIR foams are obtained depending on the isocyanate/polyol ratio, a PUR, PIR or PUR-PIR foam will be obtained according to this ratio. When the ratio of a polyol component to an isocyanate component is:

between 1:1 and 1:1.3, a polyurethane PUR foam will be obtained, between 1:1.3 and 1:1.8, a polyurethane PUR-PIR foam will be obtained, between 1:1.8 and 1:2.8, a polyurethane PIR foam will be obtained.

Polyisocyanates appropriate for the formation of PUR, PIR and PUR-PIR foam are known to a person skilled in the art and comprise, for example, aromatic, aliphatic, cycloaliphatic and arylaliphatic polyisocyanates and their mixtures, advantageously aromatic polyisocyanates.

Examples of polyisocyanates appropriate within the scope of the present invention include aromatic isocyanates, such as the 4,4'-, 2,4'- and 2,2'-isomers of diphenylmethane diisocyanate (MDI), any compound resulting from the polymerization of these isomers, toluene 2,4- and 2,6- diisocyanate (TDI), m- and p-phenylene diisocyanate, naphthalene 1,5-diisocyanate; aliphatic, cycloaliphatic or arylaliphatic isocyanates, such as 1,6-hexamethylene diisocyanate (HDI), isophorone diisocyanate (IPDI), 4,4'- dicyclohexylmethane diisocyanate (H12MDI), 1,4-cyclohexane diisocyanate (CHDI), bis(isocyanatomethyl)cyclohexane (H6XDI, DDI) and tetramethyxylylene diisocyanate (TMXDI). It is also possible to use any mixtures of these diisocyanates. Advantageously, the polyisocyanates are the 4,4'-, 2,4'- and 2,2'-isomers of diphenylmethane diisocyanate (MDI).

In general, it is known, during the formation of PUR, PIR or PUR-PIR foams, to add, to the mixture comprising the polyol, the polyisocyanate and blowing agent, a reaction catalyst which can, for example, be chosen from tertiary amines, such as N,N-dimethylcyclohexylamine or N,N-dimethylbenzylamine, or from organometallic compounds based on bismuth, potassium or tin.

Other advantageous characteristics of the invention are briefly presented below:

advantageously, the impregnation time $t_i$ observes the following formula with respect to the cream time $t_c$ of the polyurethane/polyisocyanurate foam:

$$t_i+0.1t_i<t_c<2t_i;$$

according to a preferred embodiment of the invention, the expansion of the fiber-reinforced polyurethane/polyisocyanurate foam is physically constrained by the walls of a double belt laminator (DBL) forming a tunnel, advantageously of rectangular section with a distance between the walls positioned laterally equal to L and a distance between the walls positioned horizontally equal to E, thus enclosing the expanding fiber-reinforced foam so as to obtain the abovesaid block of fiber-reinforced polyurethane/polyisocyanurate foam.

Thus, in this embodiment with a DBL, by virtue of the process according to the invention, very substantial savings are achieved, the block of fiber-reinforced foam being homogeneous and intrinsically exhibiting the excellent mechanical properties desired, in particular along the planes normal to the axis of thickness E, and along this same direction there is no reason to subsequently cut this block in order to remove end parts in which the fibers are not present and/or the cells, of ovoid shape, are not oriented along the axis E. Thus, the amount of material loss in the preparation process according to the invention is between 0% and 10%, more generally less than 5%.

still according to this preferred embodiment of the invention, advantageously, the positioning of the walls of the tunnel of the double belt laminator is defined so that the constraint on the expansion of the fiber-reinforced polyurethane/polyisocyanurate foam results in a volume of fiber-reinforced polyurethane/polyisocyanurate foam, at the outlet of the double belt laminator, representing between 85% and 99%, preferably between 90% and 99%, of the expansion volume of this same fiber-reinforced polyurethane/polyisocyanurate foam in the case of free expansion, without the constraint of the walls of such a double belt laminator. In this case, a foam is obtained, the cells of which, of ovoid shape, are preferentially oriented along the axis E, resulting in advantageous properties of resistance to crushing along this direction E (measured according to the standard ISO 844), combined with the properties already described in the plane normal to this axis E. Tests and experiments have been carried out by the applicant company to determine the broad and preferred ranges mentioned above but are not presented here for the sake of clarity and conciseness.

By virtue of the abovesaid specific parametrizing of the constraint on the expansion of the fiber-reinforced PUR/PIR foam in a DBL, on the one hand, a block of low density fiber-reinforced PUR/PIR foam is obtained in which at least 60%, generally more by 80%, indeed even more than 90%, of the cells storing a gas having low thermal conductivity extend longitudinally along an axis parallel to the axis of the thickness E of the block of foam and a contribution is made, besides the specific choices related to the characteristics of the fiber reinforcements and to the viscosity of the mixture of chemical components, to a perfect homogeneity of the block of fiber-reinforced foam. These two characteristics (orientation of the cells and homogeneity of the content $C_f$ of fibers in the block) make it possible to obtain a block of fiber-reinforced foam exhibiting excellent mechanical properties along the thickness E (compressive strength) and in a plane normal to the direction of the thickness (tensile strength and low coefficient of thermal contraction).

according to another embodiment offered by the invention, the expansion of the fiber-reinforced polyurethane/polyisocyanurate foam is free, i.e. without the constraint exerted by a volume of closed section.

In this instance, unlike the embodiment of the preparation according to the invention using a DBL, the preparation of the fiber-reinforced polyurethane/polyisocyanurate foam is said to be by "free expansion" insofar as the expansion of the fiber-reinforced foam is not constrained on at least one side or on at least one face of expansion so that the swelling of the fiber-reinforced foam is free on this side or this face, unlike a mold defining a finite volume. Conventionally, a free expansion is carried out by omitting the (top) cover while the side walls prevent the foam from overflowing over the sides and the foam naturally swells upward, possibly beyond the upper ends of these side walls.

advantageously, following the stage of free expansion of the fiber-reinforced polyurethane/polyisocyanurate foam, said fiber-reinforced foam is cut in order to obtain the abovesaid block of fiber-reinforced polyurethane/polyisocyanurate foam.

according to one possibility offered by the invention, not represented in the appended figures, just after the stage of impregnation of the fiber reinforcements, there is applied, to the mixture of components and of at least the blowing agent impregnating the fibers, a system for application of pressure (which can, for example, be a system of rollers, of the type designated "nip roll") intended to apply a pressure to the upper face of the assembly consisting of the abovesaid mixture and of the fibers. This pressure system makes it possible, on the one hand, to plan the upper face of this assembly and, by the pressure exerted on the assembly, contributes to promoting the impregnation of the fibers in the abovesaid mixture. This pressure system can consist of a single or a double roller, the relative positions of which, above the liquid assembly, and possibly below the foam support, are adjusted in such a way that the liquid assembly is forced to spread out perfectly uniformly. Thus, on doing this, an equivalent amount of the liquid assembly is obtained at any point of the section defined by the spacing between the two rollers or between the upper roller and the conveyor belt. In other words, the main object of this pressure system is to complement the liquid dispensing device in that it contributes to rendering the liquid assembly uniform, in thickness/width, before the main part of its expansion.

preferably, the dynamic viscosity η of the abovesaid mixture of components is between 30 mPa·s and 3000 mPa·s (or 0.03 Pa·s and 3 Pa·s), preferably between 50 mPa·s and 1500 mPa·s (or 0.05 Pa·s and 1.5 Pa·s), under standard temperature and pressure conditions (STPCs), corresponding to a temperature of 25° C. and a pressure of 1015 mPa.

The dynamic viscosity of the mixture of components can be determined using a viscometer, for example of Brookfield type, or a rheometer, for example using the standard ISO 2555.

advantageously, at least 60% of the abovesaid cells storing a gas, advantageously having low thermal conductivity, exhibit a shape elongated or stretched along an axis parallel to the axis of a thickness E of the block of fiber-reinforced polyurethane/polyisocyanurate foam;

more advantageously still, at least 80%, preferably at least 90%, of the abovesaid cells storing a gas, advantageously having low thermal conductivity, exhibit a shape elongated or stretched along an axis parallel to the axis of a thickness E of the block of fiber-reinforced polyurethane/polyisocyanurate foam;

The elongated or stretched shape can be defined by a shape extended in length, that is to say that it comprises one dimension (its length) which is greater than its other dimensions (width and thickness).

It is clearly understood here that this characteristic related to the elongated shape of the cells storing a gas, advantageously having low thermal conductivity, and their content/proportion in the block according to the invention, is more particularly directed in the context of the implementation of the preparation process with a DBL, but it is absolutely not limited to this scenario. This is because, in the case of a free expansion, more specifically when there is no upper wall/cover restricting the expansion of the fiber-reinforced foam, such a preferential orientation of the cells storing a gas, advantageously having low thermal conductivity, is also obtained.

according to one embodiment of the invention, the long to continuous fibers consist of glass fiber, of carbon fiber or any other organic or inorganic material, preferably of glass fiber, typically of polymeric, metallic, ceramic, glassy inorganic or organic nature, such as natural fibers, for example hemp or flax, preferably of glass fiber;

preferably, the fiber reinforcements are positioned over an entire width L and stage b) of impregnation of the fibers by the mixture of components, in order to obtain a fiber-reinforced polyurethane/polyisocyanurate foam, and of a blowing agent is carried out via a controlled liquid dispenser, simultaneously over the entire width L;

The term "simultaneously" is understood to mean the fact that the liquid mixture (reactants and at least the blowing agent) reaches the fibers, over a section of width L, at the same time all along this section so that the impregnation of the different fiber reinforcements begins or is carried out, along the thickness (or height) of the block of foam and for one and the same section of width, at the same time or at the same rate.

advantageously, the blowing agent consists of a physical and/or chemical expanding agent, preferably a combination of the two types.

preferentially, the physical expanding agent is chosen from alkanes and cycloalkanes having at least 4 carbon atoms, dialkyl ethers, esters, ketones, acetals, fluoroalkanes, fluoroolefins having between 1 and 8 carbon atoms and tetraalkylsilanes having between 1 and 3 carbon atoms in the alkyl chain, in particular tetramethylsilane, or a mixture of these.

Under this assumption, as example of compounds, it may be a matter of propane, n-butane, isobutane, cyclobutane, n-pentane, isopentane, cyclopentane, cyclohexane, dimethyl ether, methyl ethyl ether, methyl butyl ether, methyl formate, acetone and fluoroalkanes; the fluoroalkanes being chosen are those which do not degrade the ozone layer, for example trifluoropropane, 1,1,1,2-tetrafluoroethane, difluoroethane and heptafluoropropane. Examples of fluoroolefins include 1-chloro-3,3,3-trifluoropropene or 1,1,1,4,4,4-hexafluorobutene (for example HFO FEA1100, sold by DuPont).

According to a preferred embodiment of the invention, the physical expending agent chosen is 1,1,1,3,3-pentafluoropropane or HFC-245fa (sold by Honeywell), 1,1,1,3,3-pentafluorobutane or 365mfc (for example Solkane® 365mfc, sold by Solvay), 2,3,3,3-tetrafluoroprop-1-ene, 1,1,1,2,3,3,3-heptafluoropropane (also designated internationally as HFC-227ea, for example sold by DuPont), 1,1,1,4,4,4-hexafluorobutene (for example HFO FEA1100, sold by DuPont), trans-1-chloro-3,3,3-trifluoropropene (Solstice LBA-Honeywell) or a mixture of these.

advantageously, the chemical expanding agent consists of water.

advantageously, during stage a) of mixing chemical components, nucleating gas is incorporated in at least one polyol compound, preferably using a static/dynamic mixer under a pressure between 20 and 250 bar, the nucleating gas representing between 0% and 50% by volume of polyol, preferably between 0.05% and 20% by volume of the volume of polyol;

preferably, during stage a) of mixing the chemical components, the temperature of each of the reactants for obtaining polyurethane/polyisocyanurate is between 10° C. and 40° C., preferably between 15° C. and 30° C.;

Preferably, according to a preferred embodiment of the invention, the final mixing of the streams of polyols, isocyanate and/or blowing agent takes place in a mixing head at low pressure (<20 bar) or high pressure (>50 bar) using a dynamic or static mixer.

According to one possibility offered by the invention, there is additionally added, to the mixture, in stage a), an organophosphorus flame retardant, advantageously triethyl phosphate (TEP), tris(2-chloroisopropyl) phosphate (TCPP), tris(1,3-dichloroisopropyl) phosphate (TDCP), tris (2-chloroethyl) phosphate or tris(2,3-dibromopropyl) phosphate, or a mixture these, or an inorganic flame retardant, advantageously red phosphorus, expandable graphite, an aluminum oxide hydrate, an antimony trioxide, an arsenic oxide, an ammonium polyphosphate, a calcium sulfate or cyanuric acid derivatives, or a mixture of these.

It will also be possible to envisage that the flame retardant uses diethyl ethanephosphonate (DEEP), triethyl phosphate (TEP), dimethyl propylphosphonate (DMPP) or diphenyl cresyl phosphate (DPC).

This flame retardant, when it is present in the composition according to the invention, is found in an amount of between 0.01% and 25% by weight of the PUR/PIR foam.

Preferably, the content of fibers $C_f$ represents between 7% and 15% by weight of the block of fiber-reinforced foam. Preferably, the content of fibers $C_f$ represents at most 30% by weight of the block of fiber-reinforced foam.

The invention also relates to a block of fiber-reinforced polyurethane/polyisocyanurate foam of a thermal insulation slab of a sealed and thermally insulating tank, directly obtained by virtue of the process as briefly presented above, the block of fiber-reinforced polyurethane/polyisocyanurate foam being composed of cells storing a gas, advantageously having low thermal conductivity, and exhibiting a density of less than 50 kg·m$^{-3}$ with a content of fibers $C_f$ representing at least 4% by weight of the block of fiber-reinforced foam.

This block of foam is characterized in that the fibers are distributed uniformly in the block of fiber-reinforced polyurethane/polyisocyanurate foam, in such a way that the content $C_f$ varies only by +/−35% in all the zones or portions of said block of fiber-reinforced polyurethane/polyisocyanurate foam, indeed even preferably in an even more restricted range, i.e. of the order of +/−20%.

Thus, by way of example, when the content of fibers $C_f$ in the block is equal to 4%, that is to say on average in the block, this means that the content of fibers can oscillate, depending on the zone of the block, between 2.8% and 5.2% (and preferentially between 3.2% and 4.8%) and, if this mean content of fibers $C_f$ is at a value of 15%, then the content of fibers can oscillate, depending on the zone of the block, between 10.5% and 19.5% (and preferentially between 12% and 18%).

Such a block of foam intrinsically exhibits differentiating characteristics with respect to those prepared according to the prior preparation techniques. It may be noted that the characteristics relating to the nature or to the amount of the various elements presented above in connection with the process for the preparation of the block of fiber-reinforced foam can define, if appropriate, more precisely the block of fiber-reinforced PUR/PIR foam according to the invention.

Advantageously, the density of said block of foam is between 20 and 50 kg/m$^3$, preferably between 30 and 45 kg/m$^3$.

The invention also relates to a sealed and thermally insulating tank integrated in a supporting structure, said tank consisting of:

a tank integrated in a supporting structure comprising a sealed and thermally insulating tank comprising at least one sealed metal membrane composed of a plurality of metal strakes or metal plates which can comprise corrugations and a thermally insulating slab comprising at least one thermally insulating barrier adjacent to said membrane, or a tank of type B or C according to the definition given by the IGC Code comprising at least one thermally insulating slab, The tank according to the invention is characterized in that the thermally insulating slab comprises the block of fiber-reinforced polyurethane/polyisocyanurate foam briefly described above.

The expression "IGC Code" is understood to mean the "International Code for the Construction and Equipment of Ships Carrying Liquefied Gases in Bulk", well known to a person skilled in the art, like the types B and C of tanks cited.

It should be noted that it is possible, in particular in the IGC Code, to use the expression "membrane tank" instead of the expression "integrated tank" to denote one and the same category of tanks, equipping in particular tankers transporting and/or storing at least partly liquefied gas. The "membrane tanks" are integrated in a supporting structure, whereas the tanks of type B or C are said to be self-supporting.

This tank comprises a plurality of blocks of fiber-reinforced polyurethane/polyisocyanurate foam directly obtained by the abovementioned preparation process.

Finally, the invention also relates to a ship for the transportation of a cold liquid product, the ship comprising at least one hull and a sealed and thermally insulating tank as described briefly above, positioned in the hull.

Advantageously, in the case where the tank consists of a tank integrated in a supporting structure (membrane tank), such a ship comprises at least one sealed and insulating tank as described above, said tank comprising two successive sealing barriers, one, primary, in contact with a product contained in the tank and the other, secondary, positioned between the primary barrier and a supporting structure, preferably formed by at least a part of the walls of the ship, these two sealing barriers being alternated with two thermally insulating barriers or a single thermally insulating barrier positioned between the primary barrier and the supporting structure.

Such tanks are conventionally designated as integrated tanks according to the Code of the International Maritime Organization (IMO), such as, for example, tanks of type NO, including types NO 96®, NO 96L03®, NO 96L03+® or NO 96 Max®, or Mark III®, preferably tanks of type NO.

Preferably, the tank, said to be of membrane type or of type B or C, contains a liquefied natural gas (LNG) or a liquefied gas (LG).

BRIEF DESCRIPTION OF THE FIGURES

The description which will follow is given solely by way of illustration and without limitation, with reference to the appended figures, in which:

FIG. 1 is a diagrammatic view illustrating the different stages of the preparation process according to the invention FIG. 2 is a diagrammatic representation of an embodiment of a controlled liquid dispenser according to the invention FIG. 3 is a diagrammatic view of two sets of thermal insulation panels, fixed one to the other, respectively forming a primary insulation space and a secondary insulation space for a tank, these panels being formed by a plurality of blocks of fiber-reinforced polyurethane/polyisocyanurate foam according to the invention FIG. 4 is a cutaway diagrammatic representation of a tank of an LNG tanker, in which tank are installed the two sets of thermal insulation panels of the type of those represented in FIG. 3, and of a loading/unloading terminal for this tank

DESCRIPTION OF THE EMBODIMENTS

Preferably, the preparation of the fiber-reinforced PUR/PIR according to the invention is carried out in the presence of catalysts making it possible to promote the isocyanate/polyol reaction. Such compounds are described, for example, in the document of the state of the art entitled "Kunststoffhandbuch, Volume 7, Polyurethane", published by Carl Hanser, $3^{rd}$ edition, 1993, Chapter 3.4.1. These compounds comprise amine-based catalysts and catalysts based on organic compounds.

Preferably, the preparation of the fiber-reinforced PUR/PIR according to the invention is carried out in the presence of one or more stabilizers intended to promote the formation of regular cellular structures during the formation of the foam. These compounds are well known to a person skilled in the art and, by way of example, mention may be made of foam stabilizers comprising silicones, such as siloxane-oxyalkylene copolymers and other organopolysiloxanes.

A person skilled in the art knows the amounts of stabilizers, between 0.5% and 4% by weight of the PUR/PIR foam, to be used depending on the reactants envisaged.

According to one possibility offered by the invention, during stage a), the mixture of chemical components can include plasticizers, for example polybasic esters, preferably dibasic esters, of carboxylic acids with monohydric alcohols, or can consist of polymeric plasticizers, such as polyesters of adipic, sebacic and/or phthalic acids. A person skilled in the art, depending on the reactants used, knows what envisaged amount of plasticizers, conventionally from 0.05% to 7.5% by weight of the polyurethane/polyisocyanurate foam.

Organic and/or inorganic fillers, in particular reinforcing fillers, can also be envisaged in the mixture of chemical components, such as siliceous minerals, metal oxides (for example kaolin, titanium or iron oxides) and/or metal salts. The amount of these fillers, if they are present in the mixture, is conventionally between 0.5% and 15% by weight of the PUR/PIR foam.

It should be noted that the present invention is not intended here to add technical teaching to the formation of a PUR/PIR foam, both in terms of the nature of the essential chemical components and of the optional functional agents and their respective amounts. A person skilled in the art knows how to obtain different types of fiber-reinforced PUR/PIR foam and the present preparation relates, from a specific choice of the permeability characteristics of the fiber reinforcements and from a just as specific choice of viscosity of the foam during its impregnation of said reinforcements, considering moreover a relatively high or high content of long to continuous fibers, in such a way that the impregnation time $t_i$ is just less, or only just less, than the cream time $t_c$ of the polymer foam under consideration.

Thus, the present invention, as set out here, is not in the first place targeted at a new chemical preparation of fiber-reinforced PUR/PIR foam but rather at a new preparation of a block of fiber-reinforced PUR/PIR foam in which these particular characteristics of permeability of the fiber reinforcements and of viscosity/cream time of the PUR/PIR foam are defined so as to follow the rule $t_i<t_c$, and preferably:

$$0.50 < t_i/t_c < 0.91 \quad [\text{Math 1}]$$

or in other words $t_i+0.1\ t_i<t_c<2\ t_i$, the impregnation of the fibers by the foam being carried out by pouring.

Thus, as can be seen in FIG. 1, a plurality of fiber reinforcements 10 are unwound and brought along a parallel alignment with one another onto or above a conveyor belt 11 intended to carry these reinforcements 10 and the components forming the PUR/PIR foam. This is because the impregnation of the fiber reinforcements 10 is carried out, in the context of the present invention, by gravity, that is to say that the mixture 12 of chemical components, blowing agent(s) and optional other functional agents used to obtain the PUR/PIR foam is poured, from a liquid dispenser located above the fiber reinforcements 10, directly onto the fibers 10.

Thus, the abovesaid mixture 12 has to impregnate all of the fiber reinforcements 10, whether it concerns, for the latter, one or more mats or one or more fabrics, in a very homogeneous manner, during the cream time $t_c$ so that the start of the expansion of the PUR/PIR foam takes place after or at the earliest just at the moment when the fiber reinforcements 10 are definitely all impregnated by the mixture 12. On doing this, by virtue of observing the characteristics for the fiber reinforcements and the PUR/PIR foam which are defined according to the invention, the expansion of the PUR/PIR foam is carried out while maintaining perfect homogeneity of the fibers 10 in the volume of the block of PUR/PIR foam.

In the context of the invention, the cream time of the components of the mixture 12 in order to form the PUR/PIR foam is known to a person skilled in the art and chosen in such a way that the conveyor belt 11 brings the assembly formed from the mixture 12 of components, blowing agent and fibers 10, for example, up to a double belt laminator, not represented in the appended figures, while the expansion of the foam has just started, in other words the expansion of the PUR/PIR foam then ends in the double belt laminator.

In such an embodiment with a double belt laminator (DBL), a pressure system, using one or two rollers, is optionally positioned before the double belt laminator, i.e. between the zone for impregnation of the mixture on the fibers and the double belt laminator. In the case of the use of a DBL, the expansion of the volume of the foam is carried out in the laminator when the expansion volume of this foam reaches between 30% and 60% of the expansion volume of this same foam when the expansion is left free, i.e. without any constraint. On doing this, the double belt laminator will be able to constrain the expansion of the PUR/PIR foam in its second expansion phase, when the latter is close or relatively close to its maximum expansion, that is to say when its expansion brings the foam close to all of the walls, forming a tunnel of rectangular or square section, of the double belt laminator. According to a different way of presenting the specific choices of the preparation according to the invention, the gel point of the mixture of components, that is to say the moment when at least 60% of the polymerization of the mixture of components is achieved, in other words 70% to 80% of the maximum volume expansion of the mixture, obligatorily takes place in the double belt laminator, possibly in the second half of the length of the double belt laminator (i.e. closer to the outlet of the laminator than to the inlet of the latter).

As regards the function of simultaneous dispensing of the mixture 12 of chemical components and of blowing agent over the entire width L of the fiber reinforcements 10, it is provided here by a controlled liquid dispenser 15, visible in FIG. 2. Such a dispenser 15 comprises a feed channel 16 for the assembly formed of the mixture 12 of chemical components and at least blowing agent from the reservoir forming a reactant mixer, not represented in the appended figures, in which, on the one hand, all the chemical components and the blowing agent are mixed and, on the other hand, in particular the nucleation, indeed even the heating, of such a mixture is carried out. This liquid assembly formed of the mixture 12 of chemical components and of the blowing agent is then distributed, under pressure, in two channels 17 extending transversely to respectively end in two identical dispensing plates 18, extending along the width L (each having a length substantially equal to L/2), comprising a plurality of nozzles 19 for the flow of said mixture 12 over the fiber reinforcements 10. These flow nozzles 19 consist of orifices of calibrated section exhibiting a predetermined length. The length of these flow nozzles 19 is thus predetermined so that the liquid leaves with an equal flow rate between all the nozzles 19 in order for the impregnation of the fiber reinforcements 10 to take place at the same time, or simultaneously, over the section of width L of the fiber reinforcements 10, and for the surface density of liquid deposited at right angles with each nozzle to be equal. On doing this, if a section of width L of the fibers 10 is considered, the latter are impregnated concurrently so that the impregnation of the layers of fibers 10 by the mixture 12 is carried out, at all points of this section, in an identical manner, which contributes to obtaining, at the outlet of the double belt laminator, a block of fiber-reinforced foam which is perfectly homogeneous.

The controlled liquid dispenser 15 shown in this FIG. 2 is an exemplary embodiment in which two identical dispensing plates 18 are used but it will be possible to envisage a different design, insofar as the function of simultaneous dispensing of liquid over the width section of the fibers 10 is achieved. Of course, the main technical characteristic used in this instance lies in the different lengths of the flow nozzles 19, which are longer or shorter depending on the route, or path, of the liquid mixture 12 from the feed duct 16 of the dispenser 15 as far as the flow nozzle 19 under consideration.

One of the aspects of importance for achieving a good impregnation of the fiber reinforcements 10 just before the cream time $t_c$ of the PUR/PIR foam lies in the choice of a specific viscosity of the liquid (consisting of the mixture 12 of chemical components and of the blowing agent) to be linked with the specific characteristics of the fiber reinforcements. The viscosity range chosen as well as the permeability characteristics of the fiber reinforcements have to make possible good penetration of the liquid into the first layers of fibers 10, in order to reach the following ones down to the final layer (the lower layer of fibers 10, i.e. that located lowest in the stack of the fiber reinforcements), so that the impregnation time $t_i$ of the fibers 10 is carried out within the time period given by the chemical components corresponding substantially to (but always less than) the cream time $t_c$. The viscosity of the mixture 12 of components is chosen, for example by heating, additions of plasticizers and/or by a greater or lesser nucleation, so that the impregnation of all the fibers 10 by the mixture 12 chemical and of the blowing agent, over a section of width L, is obtained just before the cream time, that is to say before or just before the start of the expansion of the PUR/PIR foam.

The block of fiber-reinforced foam is intended to be used in a very particular environment, and thus has to guarantee specific mechanical and thermal properties. The block of fiber-reinforced foam obtained by the preparation according to the present invention thus conventionally forms part of a thermal insulation slab 30, i.e., in the example used in FIG. 3, in an upper or primary panel 31 and/or a lower or secondary panel 32 of such an insulation slab 30 of a tank 71 intended to receive an extremely cold liquid, such as an LNG or an LPG. Such a tank 71 can equip, for example, a ground tank, a floating barge or the like (such as an FSRU "Floating Storage Regasification Unit" or a FLNG "Floating Liquefied Natural Gas") or else a ship, such as an LNG tanker, transporting this energetic liquid between two ports.

With reference to FIG. 4, a cutaway view of an LNG tanker 70 shows a sealed and insulating tank 71 of prismatic general shape, mounted in the double hull 72 of the ship. The wall of the tank 71 comprises a primary sealed barrier intended to be in contact with the LNG contained in the tank, a secondary sealed barrier arranged between the primary sealed barrier and the double hull 72 of the ship, and two insulating barriers arranged, respectively, between the primary sealed barrier and the secondary sealed barrier and between the secondary sealed barrier and the double hull 72.

In a way known per se, loading/unloading pipes 73 positioned on the upper deck of the ship can be connected, by means of appropriate connectors, to a shipping or harbor terminal, in order to transfer a cargo of LNG from or to the tank 71.

FIG. 4 represents an example of a shipping terminal comprising a loading and unloading station 75, an underwater pipeline 76 and a land-based installation 77. The loading and unloading station 75 is a fixed offshore installation comprising a mobile arm 74 and a tower 78 which supports the mobile arm 74. The mobile arm 74 carries a bundle of insulated hoses 79 which can be connected to the loading/unloading pipes 73. The swiveling mobile arm 74 fits all sizes of LNG tankers. A linking pipeline (not represented) extends inside the tower 78. The loading and unloading station 75 allows the LNG tanker 70 to be loaded and unloaded from or to the land-based installation 77. This installation comprises liquefied gas storage tanks 80 and linking pipelines 81 connected via the underwater pipeline 76 to the loading or unloading station 75. The underwater pipeline 76 allows the transfer of liquefied gas between the loading or unloading station 75 and the land-based installation 77 over a great distance, for example 5 km, which makes it possible keep the LNG tanker 70 at a great distance from the coast during the loading and unloading operations.

To generate the pressure required for the transfer of the liquefied gas, on-board pumps in the ship 70 and/or pumps equipping the land-based installation 77 and/or pumps equipping the loading and unloading station 75 are used.

As was stated above, the use or the application of the subject matter of the present invention, namely in the case in point the block of fiber-reinforced polyurethane/polyisocyanurate foam, is not intended to be limited to an integrated tank in a supporting structure but it is also provided for tanks of type B and C of the IGC Code in force at the date of filing of the present patent application, but also for the future versions of this Code unless these very substantial modifications apply thereto for these tanks of type B and C, it being furthermore understood that other types of tanks might, under this assumption of a modification of the IGC Code, become applications which can be envisaged for the block of fiber-reinforced PUR/PIR foam according to the present invention.

In the continuation, a part of the experiments and tests carried out by the applicant company to allow it to assess the subject matter of the invention and its scope are presented, it being considered that other tests/experiments have been carried out and will be liable to be provided subsequently, if necessary/required.

A polyurethane foam composition, incorporating fibers in the form of mats, is used to demonstrate the invention, these fibers always being provided as long to continuous; more precisely, the lengths of these fibers are exactly the same in the compositions according to invention and those according to the state of the art. The applicant company has in particular tested the subject matter of the invention with fibers provided in the form of fabric and the results obtained are equivalent or virtually similar to those obtained with a mat of fibers, as presented below.

For each of these PUR foams, the fiber reinforcements exhibit characteristics which are either those defined as meeting the present invention (visible in bold type in the table of results presented below) or characteristics not meeting the definition of the invention; more precisely, in the latter case, the impregnation time for the fibers $t_i$ is greater than the cream time $t_c$ of the PU foam. It will be noted here that the case where the impregnation time for the fibers $t_i$ is much less than the cream time $t_c$, in other words the cream time $t_c$ would be more than twice the impregnation time for the fibers $t_i$ ($t_c > 2\ t_i$), is excluded because, in this case, the preparation process obviously cannot have any industrial reality.

Thus, in order to make quite sure that only the combination of particular characteristics of impermeability of the fiber reinforcements with the choice of a PUR foam exhibiting a particular cream time, or one suited to the characteristics of said fiber reinforcements, no other parameter of the preparation of a block of PUR foam is modified or different between the preparations in accordance with the invention and those in accordance with the state of the art. As nonexhaustive examples, mention may be made of the fact that the nucleation, the amounts of blowing agents, the reaction temperatures, nature and amounts of the mixture of chemical components, pouring process, distance between the pouring of the mixture of chemical components and the DBL or the device making possible the free expansion, if appropriate, are strictly identical in the cases according to the invention and the cases according to the state of the art.

Of course, it has been chosen in this instance to illustrate the invention using a PIR foam for the sake of clarity and conciseness but equivalent or virtually similar results have been obtained with PUR foams as well as PUR/PIR mixtures.

Likewise, the preparations of fiber-reinforced foam, the results of which are presented below, use the free expansion technique but the applicant company has shown that equivalent or virtually similar results, from the viewpoint of fiber-reinforced foams according to the invention and fiber-reinforced foams according to the state of the art, have been obtained using a DBL.

Furthermore, it is understood that all the compositions tested in the continuation are considered under conditions of identical density, it being understood that this parameter of the density is involved in the assessment of the performance qualities in terms of compressive strength.

For the compositions according to the state of the art, the characteristics of permeability of the fiber reinforcements and of cream time $t_c$ of the PIR foam are as follows:

TABLE 1

| Type of product | Content (relative share of the different components) | Description | Commercial reference of the product |
|---|---|---|---|
| Polyol 1 | 60-70 | 190-230 mg KOH/g | aromatic polyester polyol |
| Polyol 2 | 15-25 | 295-335 mg KOH/g | aromatic polyester polyol |
| Flame retardant | 10-20 | | triethyl phosphate |
| Isocyanate | 240-290 | 30-31.5% NCO | polymeric MDI isocyanate of Voracor CM 388 type |
| Water (chemical blowing agent) | 0.5-0.7 | | |
| Physical blowing agent | 20-24 | | Mixture of isomers of pentane: cyclo- and isopentane |
| Silicone surfactant | 0.5-1.5 | | PEO/PPO-grafted silicone |
| Catalysts | 1-1.6 | | Voracor CM639 |
|  | 0.4-0.7 | | Voracor CM420 |
| Additives | 1-2 | | Voratherm CN821 |

$K_C = 5.2 \times 10^{-9} m^2$ with $r_f = 16$ µm; $p = 0.978$; $k = 6$; $\tau = 2$; $V_f = 0.022$
$t_i$ (impregnation time) = 41 s (seconds)
with $\eta = 0.45$ Pa·s; $e_m = 2.4$ mm; $\Delta P = 5140$ Pa; $M_{sd} = 4.2$ kg/m$^2$
$t_c$ (cream time) = 15 s For the compositions according to the invention, the characteristics of permeability of the fiber reinforcements and of cream time $t_c$ of the PIR foam are as follows:

TABLE 2

| Type of product | Content (relative share of the different components) | Description | Commercial reference of the product |
|---|---|---|---|
| Polyol 1 | 60-70 | 190-230 mg KOH/g | aromatic polyester polyol |
| Polyol 2 | 15-25 | 295-335 mg KOH/g | aromatic polyester polyol |
| Flame retardant | 10-20 | | triethyl phosphate |
| Isocyanate | 240-290 | 30-31.5% NCO | polymeric MDI isocyanate of Voracor CM 388 type |
| Water (chemical blowing agent) | 0.5-0.7 | | |
| Physical blowing agent | 20-24 | | Mixture of isomers of pentane: cyclo- and isopentane |
| Silicone surfactant | 0.5-1.5 | | PEO/PPO-grafted silicone |
| Catalysts | 1-1.6 | | Voracor CM639 |
|  | 0.4-0.7 | | Voracor CM420 |
| Additives | 1-2 | | Voratherm CN821 |

$K_c = 3 \times 10^{-8} m^2$ with $r_f = 106$ µm; $p = 0.94$; $k = 6$; $\tau = 2$; $V_f = 0.057$
$t_i = 11$ s
with $\eta = 0.45$ Pa·s; $e_m = 3$ mm; $\Delta P = 4116$ Pa; $M_{sd} = 4.2$ kg/m$^2$
$t_c = 15$ s It is noted that the cream time $t_c$ for the PIR foams used is logically the same, because the foam used is identical, whatever the case, according to the state of the art and according to the invention.

Subsequent to carrying out the tests, some results are presented below, in a simplified manner, in order to illustrate the discoveries of the applicant company, in the case where the fiber reinforcements are provided in the form of at least one mat of glass fibers.

TABLE 3

| Mixture of chemical components and of blowing agents (identical density < 50 kg·m$^{-3}$ of the compositions tested, with fibers) | Characterization of the distribution of the fibers in the foam (by taking a core in the height/thickness of the block) | Performance with regard to tension, by application of the standard ISO 1926 (tension in the plane of the mat(s)) | | | Coefficient of thermal contraction, by application of the standard ASTM E 228 |
|---|---|---|---|---|---|
| | | | 23° C. | −170° C. | |
| Approximately 4% by weight of glass fibers (state of the art) | 3.6 +/−0.6 (standard deviation), i.e. +/−18% (% standard deviation) | Et (MPa) | X: 7 ± 1<br>Y: 11 ± 3 | X: 12 ± 1<br>Y: 17 ± 4 | 37 ± 5 × 10$^{-6}$ K$^{-1}$ |
| | | Rt (MPa) | X: 0.18 ± 0.01<br>Y: 0.24 ± 0.04 | X: 0.14 ± 0.02<br>Y: 0.21 ± 0.05 | |
| | | with Et: Young's modulus and Rt: elastic limit | | | |
| Approximately 8% by weight of glass fibers (state of the art) | 8.9 +/−9 (standard deviation), i.e. +/−102% (% standard deviation) | Not measurable<br>High heterogeneity of the material: separation of the fibers and of the foam, little impregnation and no dispersion of the fibers | | | Not measurable |
| Approximately 8% by weight of glass fibers | 8.7 +/−2 (standard deviation), i.e. +/−26% (% standard deviation) | Et (MPa) | 23° C.<br>X: 23 ± 5<br>Y: 19 ± 5 | −170° C.<br>X: 32 ± 9<br>Y: 30 ± 6 | 27 ± 6 × 10$^{-6}$ K$^{-1}$ |
| | | Rt (MPa) | X: 0.29 ± 0.06<br>Y: 0.22 ± 0.03 | X: 0.20 ± 0.05<br>Y: 0.22 ± 0.05 | |

TABLE 3-continued

| Mixture of chemical components and of blowing agents (identical density < 50 kg·m$^{-3}$ of the compositions tested, with fibers) | Characterization of the distribution of the fibers in the foam (by taking a core in the height/thickness of the block) | Performance with regard to tension, by application of the standard ISO 1926 (tension in the plane of the mat(s)) | | | Coefficient of thermal contraction, by application of the standard ASTM E 228 |
|---|---|---|---|---|---|
| Approximately 14% by weight of glass fibers | 13.8 +/−3.6 (standard deviation), i.e. +/−31% (% standard deviation) | Et (MPa) | 23° C.<br>X: na<br>Y: 19 ± 1 | −170° C.<br>X: 36<br>Y: 39 ± 12 | 25 ± 6 × 10$^{-6}$ K$^{-1}$ |
| | | Rt (MPa) | X: na<br>Y: 0.31 ± 0.02 | X: 0.19<br>Y: 0.25 ± 0.09 | |

As is seen with the results presented in the table above, with regard to the three criteria considered in order to compare the fiber-reinforced foams obtained, those in accordance with the invention exhibit results which are very significantly better than those of the fiber-reinforced foams according to the state of the art.

Furthermore, it should be noted that the fiber-reinforced PUR/PIR foams according to the invention do not exhibit any significant deterioration in their property relating to the (very low) thermal conductivity. Thus, by way of example, for the fiber-reinforced foam having 10% of fibers by weight according to the invention, the following values of thermal conductivity are obtained:

TABLE 4

| Thermal conductivity (mW/m · K) | | |
|---|---|---|
| at −160° C. | at −120° C. | at +20° C. |
| 10-14 | 11-16 | 23-27 |

Although the invention as been described in connection with several particular embodiments, it is quite obvious that it is in no way limited thereto and that it comprises all the technical equivalents of the means described as well as their combinations, if these come within the scope of the invention.

The use of the verb "to comprise" or "to include" and of its conjugated forms does not exclude the presence of other elements or of other stages than those set out in a claim.

In the claims, any reference sign in brackets should not be interpreted as a limitation on the claim.

The invention claimed is:

1. A process for the preparation of a block of fiber-reinforced polyurethane and/or polyisocyanurate foam of a thermal insulation slab of a sealed and thermally insulating tank, the block of fiber-reinforced polyurethane and/or polyisocyanurate foam being composed of cells storing a gas and exhibiting a density of less than 50 kg/m$^3$ with a content of fibers $C_f$ representing at least 4% by weight of the block of fiber-reinforced foam, the preparation process comprising:
   a) mixing chemical components necessary for obtaining a polyurethane and/or polyisocyanurate foam, said components comprising reactants for obtaining polyurethane and/or polyisocyanurate, optionally at least one reaction catalyst, optionally at least one emulsifier, and at least one blowing agent,
   b) impregnating, by gravitational flow of the mixture of chemical components obtained in a), of a plurality of fiber reinforcements chosen from fabrics of fibers and mats of fibers, said fabrics of fibers and said mats of fibers having a length of at least five centimeters (cm), arranged in superimposed layers, in which the plurality of fiber reinforcements extend essentially along a direction perpendicular to the direction of said gravitational flow, the plurality of fiber reinforcements exhibiting a permeability $K_c$ to the mixture of chemical components obtained in a), expressed in m$^2$, equal to:

$$K_c = (r_f^2 \times p^3)/(k \times \tau^2 \times 4 \times V_f^2), \text{with}$$

$r_f$=mean radius of the fibers in the fabrics of fibers or mats of fibers, expressed in meters (m),
   p=porosity of the fibers in the plurality of fiber reinforcements which is dimensionless with a value between 0 and 1,
   k=form factor of the plurality of fiber reinforcements, which is dimensionless, wherein k=1 for a fabric of fibers and k=6 for a mat of fibers,
   τ=tortuosity of the fabrics of fibers or mats of fibers constituting the plurality of fiber reinforcements, which is dimensionless,
   $V_f$=volume fraction of the fabrics of fibers or mats of fibers in the plurality of fiber reinforcements, value between 0 and 1, and
   c) forming and expanding of the fiber-reinforced polyurethane and/or polyisocyanurate foam,
   characterized in that the mixture of chemical components obtained in a) exhibits a dynamic viscosity η, during the impregnation stage b), such that an impregnation time of the fabrics of fibers or mats of fibers $t_i$ is less than the cream time $t_c$ of the polyurethane and/or polyisocyanurate foam, the impregnation time of the fabrics of fibers and mats of fibers $t_i$ being equal to:

$$t_i = (\eta \times e_m^2)/(K_c \times \Delta P),$$

$$\Delta P = (M_{sd} \times g_r \times k_p), \text{with}$$

η=the dynamic viscosity, expressed in pascal·seconds (Pa·s),
   $e_m$=sum of the mean thicknesses of the plurality of fiber reinforcements, expressed in meters (m), each fiber reinforcement exhibiting a mean thickness corresponding to the mean of the distances between a plurality of pairs of local extremums of said fiber reinforcement spaced out from one another along a direction of thickness of said fiber reinforcement, $\Delta P$=pressure gradient, expressed in pascals (Pa), $M_{sd}$=surface density of the mixture of chemical components obtained in a), expressed in kilogram per square meter (kg/m$^2$), $g_r$=9.8 N/kg$^1$, and $k_p$=0.5.

2. The process as claimed in claim 1, in which the impregnation time $t_i$ observes the following formula with respect to the cream time $t_c$ of the polyurethane and/or polyisocyanurate foam:

$$0.50 < t_i/t_c < 0.91.$$

3. The process as claimed in claim 1, in which the expansion of the fiber-reinforced polyurethane and/or polyisocyanurate foam is physically constrained by the walls of a double belt laminator forming a tunnel, thus enclosing the expanding fiber-reinforced foam so as to obtain the block of fiber-reinforced polyurethane and/or polyisocyanurate foam.

4. The process as claimed in claim 3, in which the positioning of the walls of the tunnel of the double belt laminator is defined so that the constraint on the expansion of the fiber-reinforced polyurethane and/or polyisocyanurate foam results in a volume of fiber-reinforced polyurethane and/or polyisocyanurate foam, at the outlet of the double belt laminator, representing between 85% and 99%, of the expansion volume of an identical fiber-reinforced polyurethane and/or polyisocyanurate foam freely expanded without the constraint of the walls of the double belt laminator.

5. The process as claimed in claim 1, in which the expansion of the fiber-reinforced polyurethane and/or polyisocyanurate foam occurs freely, without any constraint exerted by a volume of closed section.

6. The process as claimed in claim 5, in which, following the stage of free expansion of the fiber-reinforced polyurethane and/or polyisocyanurate foam, said fiber-reinforced foam is cut in order to obtain the block of fiber-reinforced polyurethane and/or polyisocyanurate foam.

7. The process as claimed in claim 1, in which the dynamic viscosity η of the mixture of chemical components obtained in a) is between 30 mPa·s, and 3000 mPa·s, under standard temperature and pressure conditions.

8. The process as claimed in claim 1, in which at least 60% of said cells storing a gas exhibit a shape elongated or stretched along an axis parallel to the axis of a thickness E of the block of fiber-reinforced polyurethane and/or polyisocyanurate foam.

9. The process as claimed in claim 1, in which at least 80% of said cells storing a gas, exhibit a shape elongated or stretched along an axis parallel to the axis of a thickness E of the block of fiber-reinforced polyurethane and/or polyisocyanurate foam.

10. The process as claimed in claim 1, in which the fibers of the fabrics of fibers or mats of fibers are long to continuous and consist of glass fiber, of carbon fiber or any other organic or inorganic material.

11. The process as claimed in claim 1, in which step b) further comprises a preparation process comprising positioning the fiber reinforcements over an entire width L and impregnating the plurality of fibers reinforcements by the mixture of chemical compounds obtained in a) is performed with a controlled liquid dispenser, simultaneously over the entire width L, in order to obtain the fiber-reinforced polyurethane and/or polyisocyanurate foam.

12. The process as claimed in claim 11, in which a blowing agent of the at least one blowing agent consists of a physical expanding agent chosen from alkanes and cycloalkanes having at least 4 carbon atoms, dialkyl ethers, esters, ketones, acetals, fluoroalkanes, fluoroolefins having between 1 and 8 carbon atoms and tetraalkylsilanes having between 1 and 3 carbon atoms in the alkyl chain or a mixture of these.

13. The process as claimed in claim 11, in which the at least one blowing agent comprises water.

14. The process as claimed in claim 12, in which, the mixing chemical components include at least one polyol compound and during a) a nucleating gas is incorporated in the at least one polyol compound, the nucleating gas representing between greater than 0% and 50% by volume of the at least one polyol compound.

15. The process as claimed in claim 1, in which, a) mixing the chemical components, the temperature of each of the reactants for obtaining polyurethane and/or polyisocyanurate is between 10° C. and 40° C.

16. The process as claimed in claim 1, in which there is additionally added to the mixture, in a), an organophosphorus flame retardant, or an inorganic flame retardant.

17. The process as claimed in claim 1, in which the content of fibers $C_f$ represents between 7% and 15% by weight of the block of fiber-reinforced foam.

18. A block of fiber-reinforced polyurethane and/or polyisocyanurate foam of a thermal insulation slab of a sealed and thermally insulating tank obtained by the process of claim 1, characterized in that the fibers are distributed uniformly in such a way that the content $C_f$ varies only by +/−35%, in all zones or portions of said block of fiber-reinforced polyurethane and/or polyisocyanurate foam.

19. A sealed and thermally insulating tank, said tank consisting of:
a tank integrated in a supporting structure comprising a sealed and thermally insulating tank comprising at least one sealed metal membrane composed of a plurality of metal strakes or metal plates which can comprise corrugations and a thermally insulating slab comprising at least one thermally insulating barrier adjacent to said membrane, or
a tank of type B or a tank of type C according to the definition given by the IGC Code comprising a thermally insulating slab,
characterized in that the thermally insulating slab comprises the block of fiber-reinforced polyurethane and/or polyisocyanurate foam as claimed in claim 18.

20. A ship for the transportation of a cold liquid product, the ship comprising at least one hull and a sealed and thermally insulating tank as claimed in claim 19, positioned in the at least one hull.

* * * * *